United States Patent

Maeder

[11] 4,035,680
[45] July 12, 1977

[54] VARIABLE RELUCTANCE MOTOR

[75] Inventor: Claude Robert Maeder, Nancy, France

[73] Assignee: Pont-A-Mousson S.A., Nancy, France

[21] Appl. No.: 684,825

[22] Filed: May 10, 1976

[30] Foreign Application Priority Data

June 17, 1975 France .............................. 75.18841

[51] Int. Cl.² ....................................... H02K 17/42
[52] U.S. Cl. ............................................... 310/168
[58] Field of Search ............ 310/168, 268; 318/166

[56] References Cited

U.S. PATENT DOCUMENTS

| | | | |
|---|---|---|---|
| 2,500,730 | 3/1950 | Yonkers | 310/168 |
| 2,826,730 | 3/1958 | Biffi | 310/168 |
| 2,827,582 | 3/1958 | Krebs | 310/168 |

Primary Examiner—Herman J. Hohauser
Attorney, Agent, or Firm—Sughrue, Rothwell, Mion, Zinn and Macpeak

[57] ABSTRACT

The motor has a first element carrying toothed studs and windings mounted on the studs and a second element constituted by a mass of magnetic material on which second element there are formed teeth capable of effecting a relative movement with respect to the teeth of the first element, the number of teeth of the first element being different from the number of teeth of the second element so that said teeth are capable of modifying the reluctance of the magnetic circuits that they constitute respectively with said studs, in order to produce a relative movement of the two elements when the windings are supplied with a poly-phase current. The number of teeth of the two elements satisfies the following relation:

$$\{Z_I - Z_{II}\} = sk$$

in which:

$Z_I$ = number of teeth of the first element including fictive teeth which may be assumed to be located between the studs;

$Z_{II}$ = number of teeth of the second element;

$s$ = number of studs per phase of the supply;

$k$ = a submultiple of the number of phases of said supply, at the most equal to one third of the number of phases.

19 Claims, 16 Drawing Figures

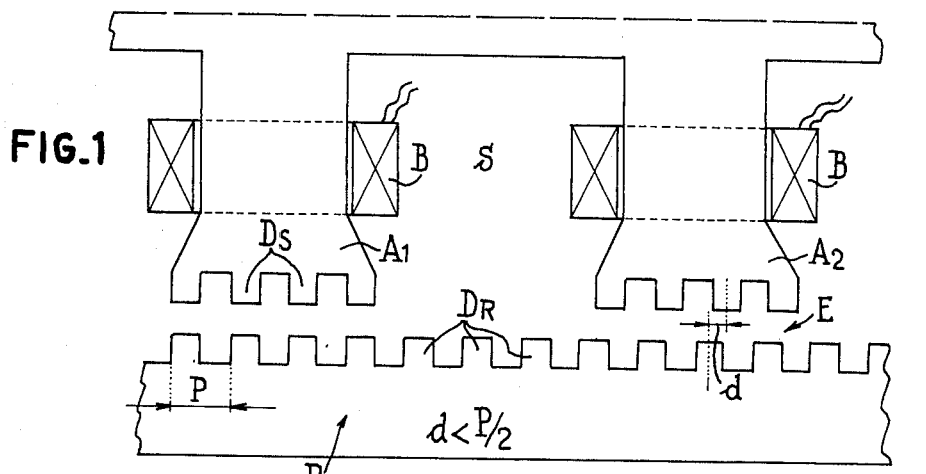
FIG.1
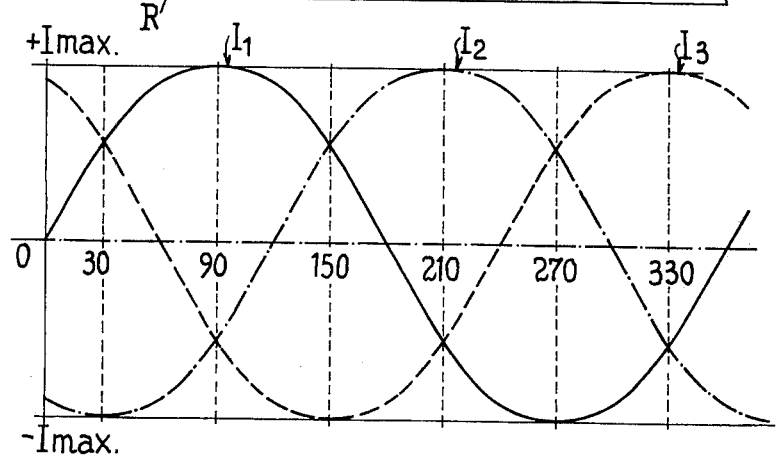
FIG.3a
FIG.3b
| I | N/2 | N | N/2 | S/2 | S | S/2 |
|---|---|---|---|---|---|---|
| II | S | S/2 | N/2 | N | N/2 | S/2 |
| III | N/2 | S/2 | S | S/2 | N/2 | N |
| IV | N/2 | N | N/2 | S/2 | S | S/2 |
| V | S | S/2 | N/2 | N | N/2 | S/2 |
| VI | N/2 | S/2 | S | S/2 | N/2 | N |
| VII | N/2 | N | N/2 | S/2 | S | S/2 |
| VIII | S | S/2 | N/2 | N | N/2 | S/2 |
| IX | N/2 | S/2 | S | S/2 | N/2 | N |
| X | N/2 | N | N/2 | S/2 | S | S/2 |
| XI | S | S/2 | N/2 | N | N/2 | S/2 |
| XII | N/2 | S/2 | S | S/2 | N/2 | N |

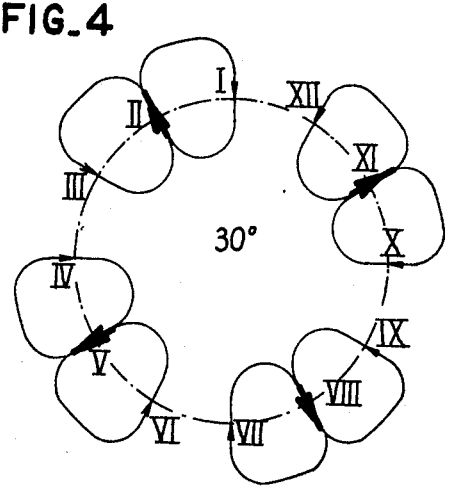
FIG_4
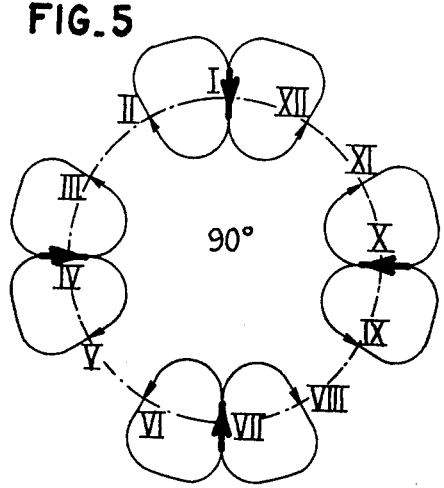
FIG_5
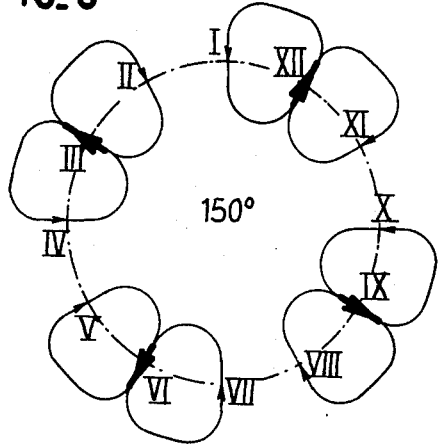
FIG_6
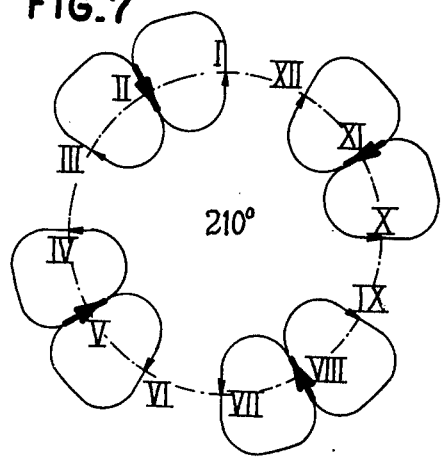
FIG_7
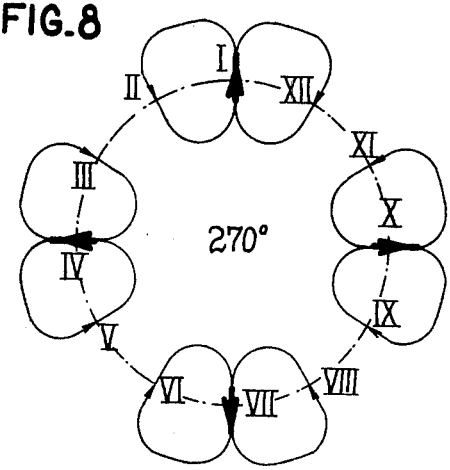
FIG_8
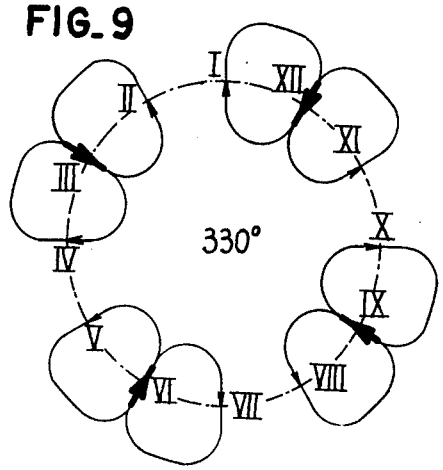
FIG_9

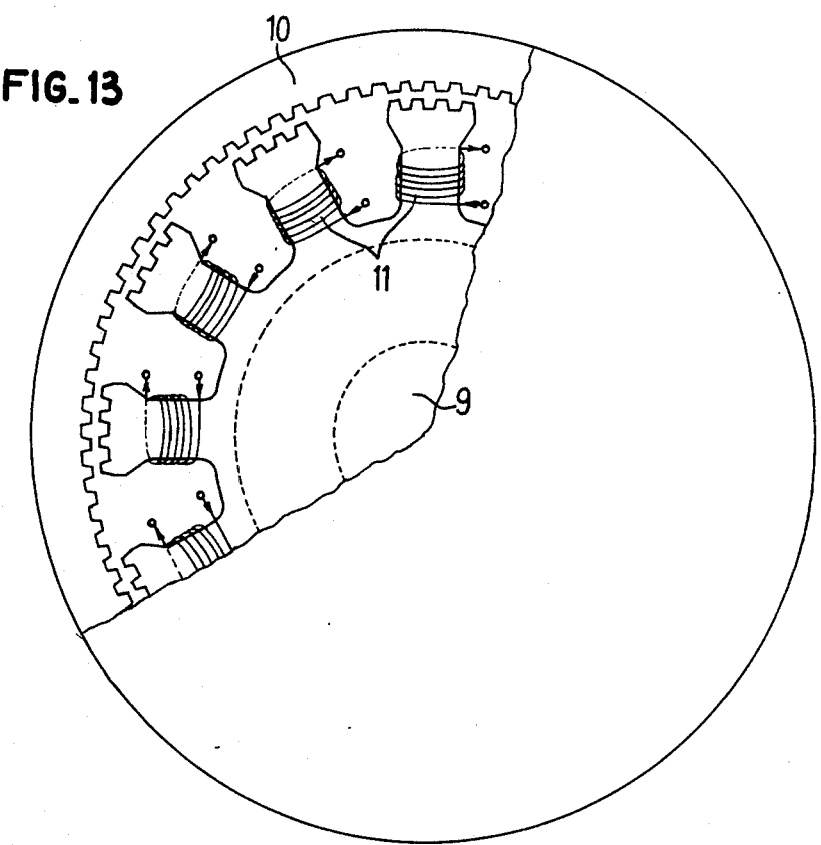
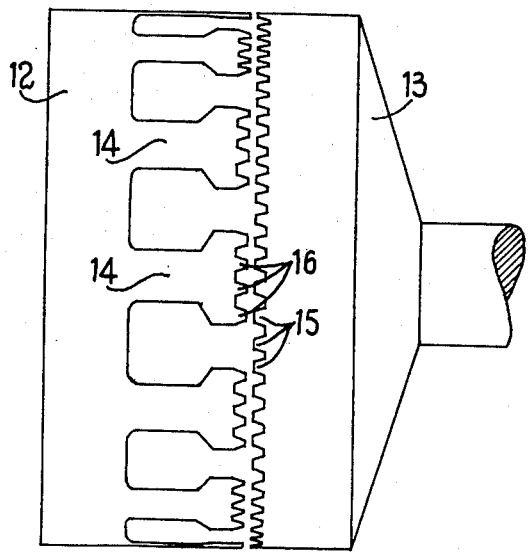
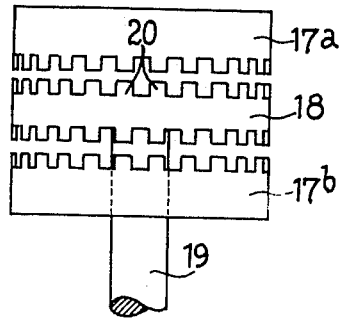

VARIABLE RELUCTANCE MOTOR

The present invention relates to variable reluctance motors and more particularly to such motors in which a fixed element and a movable element are provided, one of which elements is provided with a number of windings mounted on toothed studs whereas the other element is constituted by a mass of toothed magnetic material, the number of teeth of the first element being different from the number of teeth of the second element so that these teeth can produce magnetic circuits having a variable reluctance which results in a relative movement of the two elements when the windings are excited in accordance with a given sequence.

In order to obtain this suitable sequence of excitation of the windings it is already known to add to such motors an electronic unit provided for example with thyristors which are connected in series with the windings and are triggered at appropriate instants by a transistorized control circuit.

In order to eliminate such an electronic unit which is complicated and costly to construct, it has already been envisaged to supply the variable reluctance motors of the aforementioned type from a three-phase current source and to control the windings of the motor in accordance with the alternations of this current. A motor suitable for such a utilization is disclosed in French Patent Application No. 74 18 161. However, the motor disclosed in said patent application requires the addition of rectifying diodes in series with the excitation windings and can only be employed with a three-phase current source.

An object of the invention is to provide a variable reluctance motor which, in addition to having all the advantages, and in particular an excellent efficiency, of the motor of the aforementioned patent application, can be connected directly to a source of alternating current with no insertion of any electronic components. Moreover, in starting with the same basic principle this motor may be designed to operate with a voltage having any number of phases.

According to the invention, there is provided a variable reluctance motor comprising a fixed element and a moving element, a first of which elements is provided with a number of windings mounted on toothed studs and the second of which elements is constituted by a mass of magnetic material on which second element there are formed teeth capable of effecting a relative movement with respect to the teeth of the first element, the number of teeth of the first element being different from the number of teeth of the second element so that said teeth are capable of modifying the reluctance of the magnetic circuits that they constitute respectively with said studs, in order to produce a relative movement of the two elements when the windings are supplied with a poly-phase current, wherein the number of teeth of the two elements satisfies the following relation:

$$|Z_I - Z_{II}| = sk$$

in which:

$Z_I$ = number of teeth of the first element including fictive teeth which may be assumed to be located between the suds;
$Z_{II}$ = number of teeth of the second element;
$s$ = number of studs per phase of the supply;
$k$ = a submultiple of the number of phases of said supply, at the most equal to one third of the number of phases.

Further features of the invention will be apparent from the ensuing description with reference to the accompanying drawings which are given solely by way of example and in which:

FIG. 1 is a diagram showing the operation of a variable reluctance motor;

FIGS. 3a and 3b and FIGS. 4 to 9 illustrate the generation of the rotating fields in the motor shown in FIG. 2;

Figure 2:
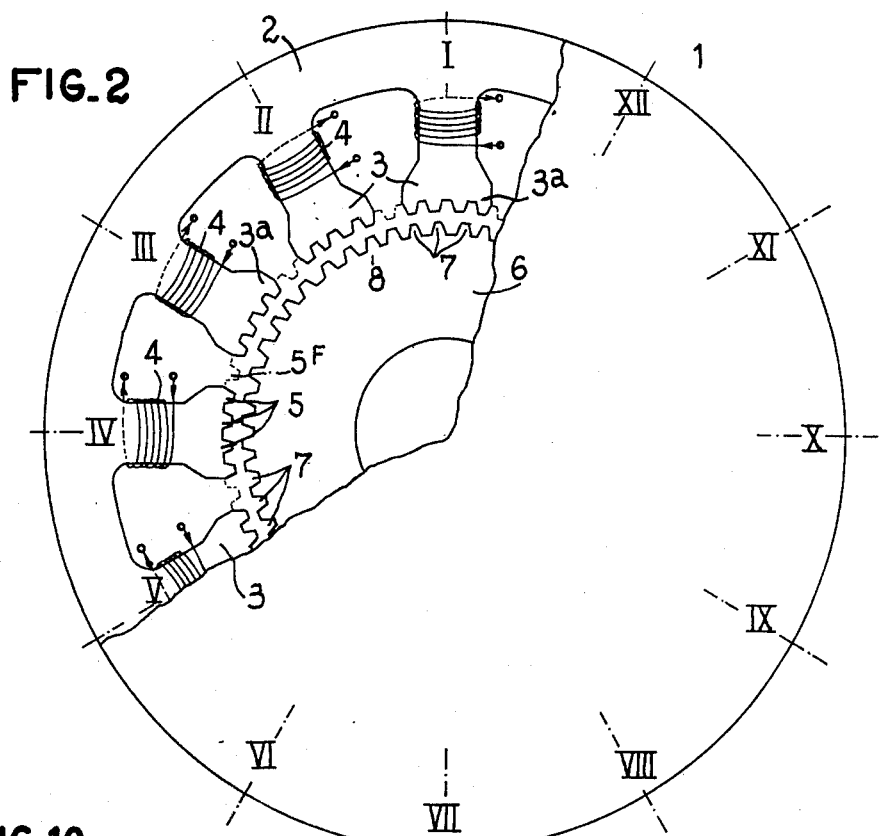
FIG. 2 is a diagrammatic view, partly in radial section, of a variable reluctance motor according to the invention.

With reference to FIG. 1, the operation of a known type of a variable reluctance motor will first be recalled. In FIG. 1, there has been shown two consecutive studs or stubs $A_1$ and $A_2$ of an element of the motor which is assumed to be in this case the fixed element or stator S. These studs, of a magnetic material, are surrounded by windings or coils B which may be excited in accordance with a given sequence by means of a commutator device (not shown). Each stud $A_1$ and $A_2$ have a number of teeth $D_S$ in front of which move the teeth $D_R$ of another element, here assumed to be the moving element, or rotor R, which is made from a magnetic material but on which no magnetic pole is created a priori. An air gap E is provided between the stator teeth and rotor teeth.

It is known that the operation of such a motor is based on the fact that there exists between the stator teeth $D_S$ of two consecutive studs, on one hand, and the rotor teeth $D_R$ on the other, a certain offset $d$, the pitch of the teeth being indicated by $p$. Thus, if only the winding B of the stud $A_1$ is excited, nothing happens in the situation shown in FIG. 1, since the facing teeth coincide exactly and the reluctance of the magnetic circuit obtained is minimum.

But, if the windings B of the two studs $A_1$ and $A_2$ are excited, the rotor will seek a position in which the reluctance of the two circuits is minimum. Consequently, the rotor moves. If thereafter only the winding of the stud $A_2$ is excited there is a new movement of the rotor so that the teeth of the latter coincide with those of the stud $A_2$. This operation is obtained on the double condition that $d < p/2$ and that the windings B are excited in accordance with a well-determined sequence.

It will be clear that by disposing the assembly on a circumference, a motor operating in a rotary manner will be obtained. The commuation of the windings has been achieved up to the present time by means of electronic commutator devices and also by employing the variation in the alternating current by creating in the motor one or several rotating fields, for example by means of a three-phase voltage. However, up to the present time, it has not been possible to dispense with electronic elements, such as diodes, for employing the latter supply system for the windings.

An object of the present invention is therefore to ensure the offset $d$ of the teeth of the moving element with respect to the teeth of the fixed element by establishing a given relation between the number of teeth of the fixed element and the number of teeth of the moving element and the supply system employing alternating current which it is desired to impose on the motor, which relation permits the design of a whole range of motors which may be supplied by an alternating polyphase voltage with no necessity to employ any electronic commutator element, such as a diode, thyristor or other element.

Thus, according to the invention, let it be assumed:

$Z_I$ = number of teeth of the first element including the number of said fictive teeth which would be located between consecutive studs of this element if its teeth were continuous;

$Z_{II}$ = number of teeth of the second element;

$s$ = number of studs of the first element per phase of the supply voltage:

$$|Z_I - Z_{II}| = s.k$$

in which relation $k$ is a submultiple of the number of phases $n$ with which it is desired to supply the motor, $k$ being at the most equal to $n/3$ owing to the fact that it is necessary to have, at the minimum, a number of phases equal to 3 to create in this motor a rotating field responsible for the commutation of the flux prevailing in the studs of the motor. Thus, the aforementioned relation directly relates the number of phases of the voltage to the difference between the numbers of teeth of the moving element and fixed element of the motor.

As the magnitude $s$ determines the number of rotating fields in the motor or, in other words, the number of pairs of poles produced, it is possible to calculate by choosing the number of studs per phase and the nature of the supply voltage, the total number of studs of the motor according to the relation:

$$P = s \times n.$$

Moreover, the speed of rotation of such a motor is calculated by means of the relation:

$$\Omega = 60 f k / Z_I \text{ or } II$$

in which:

$\Omega$ = the speed of rotation in rpm;
$f$ = frequency of the supply voltage;
$Z$ = the number of teeth of the moving element.

By means of these relations, it is possible, by way of example (to which the invention is not intended is not intended to be limited) to establish the following table giving different possible embodiments of the motor according to the invention:

| variables | | EMBODIMENTS OF MOTOR | | | | | | |
|---|---|---|---|---|---|---|---|---|
| | | A | B | C | D | E | F | G |
| number of rotating fields of studs per phase | ch s | 4 | 2 | 1 | | | | |
| number of studs | P | 12 | 12 | 12 | | | | |
| number of phases | n | 3 | 6 | 12 | | | | |
| third of n | $\frac{n}{3}$ | 1 | 2 | 4 | | | | |
| submutiple of n at the most equal to a third of n | k | 1 | 1 | 2 | 1 | 2 | 3 | 4 |
| difference $\|Z_s - Z_r\|$ | s.k | 4 | 2 | 4 | 1 | 2 | 3 | 4 |
| number of teeth of stator | $Z_s$ | 60 | 60 | 60 | 60 | 60 | 60 | 60 |
| number of teeth of rotor | $Z_r$ | 56 | 58 | 56 | 59 | 58 | 57 | 56 |
| speed of the motor for a frequency of 50 | $\Omega$ | 107 | 52 | 107 | 51 | 103 | 158 | 214 |

| variables | EMBODIMENTS OF MOTOR | | | | | | |
|---|---|---|---|---|---|---|---|
| | A | B | C | D | E | F | G |
| cycles per second | | | | | | | |

Note that the relation given hereinbefore also applies in the case where the moving element has a number of teeth greater than the number of teeth of the fixed element.

FIG. 2 shows a preferred embodiment of the invention. It comprises a stator 1 of a magnetic material of circular section comprising an outer ring 2 from which project radially inwardly studs or stubs 3 which are evenly spaced on the periphery and are twelve in number in the illustrated case (I to XII). Each stud of the stator carries a coil or winding 1 the connection of which will be described hereinafter. The free end face of each stud has a plurality of teeth 5n, four in number in the illustrated embodiment. However, in the calculation of the difference between the numbers of rotor teeth and stator teeth, there is also taken into account, for each stud 3, a fictive tooth $5_F$ which does not exist but which will be assumed to be located adjacent the teeth of the studs in question, as indicated in dotted lines in FIG. 2. It will be understood that, in actual fact, this tooth cannot be provided for production reasons, in particular in order to permit disposing the winding 4 around its stud 3. It is, moreover, clear that each stud 3 is wider at 3a in the portion is which the teeth 5 are provided. Moreover, FIG. 2 shows that all the windings 4 of the stator are wound in the same direction around their respective studs so that the magnetic field generated by a winding in its associated stud can close onto the studs which are adjacent thereto.

The motor also has a rotor 6 formed by a wheel of a magnetic material carrying on its periphery teeth 7 which move in front of the stator teeth 5 with which latter teeth they define an airgap 8, the stator and rotor being of course concentric. This rotor defines no magnetic pole in itself.

In the illustrated embodiment, as each stud 3 of the stator has four teeth 5 and as the studs are twelve in number, the total number $Z_s$ of stator teeth is sixty including the fictive teeth 5F.

Moreover, if a three-phase supply voltage is chosen, there will be a number of studs per phase $s = P/n$, namely 4, which gives a motor having four pairs of magnetic poles. Under these conditions, $Z_R$ can therefore be: $60 - 4 = 56$ in which $k$ is equal to 1, but $Z_R$ may also be equal to 64, as both numbers satisfy the condition according to which the offset between the rotor teeth, on one hand, and the stator teeth of two consecutive studs, on the other is less than one half a pitch of the teeth.

Bearing in mind that each stud 3 is supplied by a sinusoidal voltage, its field will have a sinusoidal appearance which is shifted in phase, with respect to the voltage, by a phase shift angle which depends in particular on the ohmic resistance of the winding. Whatever this may be, if the two curves of the sinusoidal currents in the twelve windings I to XII (FIG. 3a) are plotted, there can be established the table shown in FIG. 3b in which there is indicated the sign and magnitude of the magnetic fluxes in the studs respectively at 30°, 90°, 150°, 210°, 270° and 330° of a cycle of the currents. It is assumed in this example that the windings I to XII are connected in accordance with the diagram shown in FIG. 10. It appears from this table that, when the flux in a given stud is maximum and of a given sign, the two adjacent studs have passing therethrough a flux of opposite sign and of a magnitude reduced by one half.

Thus, it can be seen that the motor according to the invention combines the advantages of the motor described in the aforementioned patent application, obtained owing to the particular characteristics just mentioned with the considerable advantage of permitting the connection of the motor directly to a supply without any other auxiliary component.

FIGS. 4 to 9 show, at each one of the instants considered in FIGS. 3a and 3b, the direction and magnitude of the fluxes in the twelve studs of the motor. Thus it can be seen that a rotating field is produced in this motor and effects half a rotation per double alternation. During this time, the rotor 6 has rotated to the extent of two teeth so that the speed, in rpm, of this rotor will be:

$$\Omega = 2 \times 50 \times 60/56 = 107 \text{ r.p.m.}$$

the frequency of the current source being 50 Hz.

The stator 1 and the rotor 6 can be constructed from any suitable magnetic material. A material which is but little like of producing eddy currents is of course preferred. There may be chosen, for example, mild steel, stacked sheets of silicon steel, for example, of sintered metal or an epoxide resin charged with particles of a magnetic metal such as iron.

Figure 10:
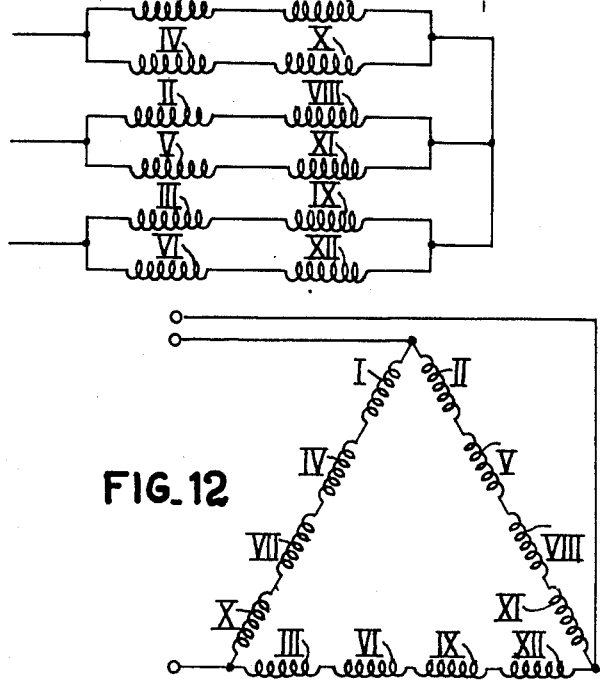
FIGS. 10 to 12 show by way of example three modes of connection of the motor shown in FIG. 2, and FIGS. 13 to 15 are diagrams illustrating various possible modifications of the motor according to the invention.
Figure 11:
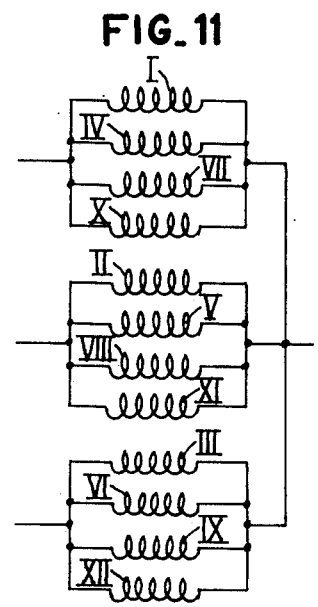
Figure 12:
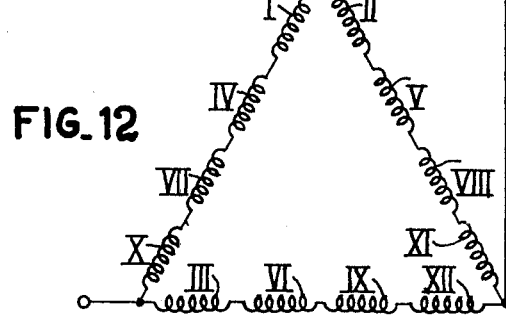

FIGS. 10-12 show a few possibilities of the connections of the windings 4 of the motor shown in FIG. 2. The type of connections may be star (FIGS. 10 and 11) or delta (FIG. 12). It can be seen that the windings may be connected in series in pairs which are themselves connected in parallel, all in parallel or all in series irrespective of the chosen configuration.

It is also possible to supply the motor with a single-phase voltage converted in the conventional manner into a three-phase voltage by phase-shifting capacitors.

FIGS. 13-15 show several possible modifications of the motor shown in FIG. 2. However, note that these modifications may be applied to all the motors which are designed in accordance with the invention and satisfy the aforementioned relation.

FIG. 15 shows a modification in which two moving elements 9 and 10 of a generally cylindrical shape are disposed coaxially to each other, the inner element 9 carrying outwardly extending toothed radial studs 11 carrying windings, whereas the outer element is a ring which is internally toothed. In this case, the inner element 9 may be fixed and may constitute the stator whereas the moving element is formed by the outer ring, but the stator and rotor may also be disposed the other way round.

In FIG. 14, a motor is shown in which there are provided two elements 12 and 13 formed by cylindrical bodies aligned on a common axis. The confronting faces of these two elements have, the element 12, a series of axial studs 14 which are toothed and carry windings and, the element 13, a ring of teeth 15 formed in facing relation to teeth 16 of the studs of the element 12. In this case also, either element may be the stator or rotor.

FIG. 15 shows another modification in which the stator element comprises two cylindrical parts 17a and 17b which are mounted coaxially with each other and with a rotor element 18. The two parts 17a and 17b are designed in the same way as the element 12 shown in FIG. 14, the studs having being omitted in order to simplify the drawing. In this case, the rotor 18 is integral with a shaft 19 which extends through the part 17b of the stator and has peripheral teeth 20 in front of each part of the stator. In this case, the relation according to the invention applies of course to each assembly of a stator part and a group of teeth of the rotor which are on the face of the latter confronting the stator part in question.

The invention thus provides a motor directly supplied with a poly-phase voltage, which may take on a multitude various forms. In particular, in starting with a given stator arrangement, it is possible to impart to the motor various speeds of rotation, either by employing rotors having different numbers of teeth, or by connecting the windings of the stator to different polyphase sources.

Note that the output speeds of the motors according to the invention are relatively low, which may be very advantageous in certain cases for replacing conventional motor-speed reducer units or for the motorization of certain controls.

Having now described my invention what I claim as new and desire to secure by Letters Patent is:

1. A motor device comprising in combination a source of polyphase current and a motor of the variable reluctance type, the motor comprising a fixed element and a moving element, a first of which elements carries toothed studs and windings mounted on the toothed studs and the second of which elements is constituted by a mass of magnetic material on which second element there are formed teeth capable of effecting a relative movement with respect to the teeth of the first element, the number of teeth of the first element being different from the number of teeth of the second element so that said teeth are capable of modifying the reluctance of the magnetic circuits that they constitute respectively with said studs, in order to produce a relative movement of the two elements when the windings are supplied with a poly-phase current, wherein the number of teeth of the two elements satisfies the following relation:

$$\left| Z_I - Z_{II} \right| = sk$$

in which:
$Z_I$ = number of teeth of the first element including fictive teeth which may be assumed to be located between the studs;
$Z_{II}$ = number of teeth of the second element;
$s$ = number of studs per phase of the supply;
$k$ = a submultiple of the number of phases of said supply, at the most equal to one third of the number of phases.

2. A device as claimed in claim 1, wherein all the windings are wound in the same direction on their respective studs so that the magnetic field generated in a given stud can close onto the two adjacent studs.

3. A device as claimed in claim 1, wherein said elements have a generally cylindrical and coaxial form.

4. A device as claimed in claim in claim 3, wherein the first element is a stator and the second element is a rotor.

5. A device as claimed in claim 3, wherein the first element is a rotor and the second element is a stator.

6. A device as claimed in claim 3, wherein the first element is surrounded by the second element.

7. A device as claimed in claim 3, wherein the second element is surrounded by the first element.

8. A device as claimed in claim 3, wherein said teeth are respectively formed on confronting cylindrical surfaces of the two elements.

9. A device as claimed in claim 3, wherein said teeth are respectively formed on confronting radial faces of the two elements.

10. A device as claimed in claim 9, wherein one of said elements is constructed in two parts, each of which parts carries the same number of teeth on confronting radial faces, the other of said elements being interposed between the two parts of said one element and carrying teeth on each one of its radial faces.

11. A device as claimed in claim 1, wherein the windings of the studs are connected individually in the form of a triangle.

12. A device as claimed in claim 1, wherein the windings of the studs are connected individually in the form of a star.

13. A device as claimed in claim 1, wherein the windings of the studs are connected by groups in a delta configuration.

14. A device as claimed in claim 1, wherein the windings of the studs are connected by groups in a star configuration.

15. A device as claimed in claim 1, wherein the windings connected to the same phase of said source are connected in series.

16. A device as claimed in claim 1, wherein the windings connected to the same phase of said source are connected in parallel.

17. A device as claimed in claim 1, wherein the windings connected to the same phase of said source are connected in series by groups, the groups being connected in parallel.

18. A device as claimed in claim 1, wherein the magnetic circuit of at least one of said elements is made from a material selected from the group consisting of soft iron, stacked sheet metal, sintered metal, an epoxide resin charged with particles of a magnetic metal such as iron.

19. A device as claimed in claim 1, wherein said studs are twelve in number and said windings are connected in such manner as to constitute four pairs of magnetic poles after connection to a three-phase supply.

* * * * *